Feb. 13, 1968  C. J. GREGOROVICH  3,368,479
ROLLING BOLSTER MECHANISM FOR A PRESS
Filed Feb. 16, 1966  10 Sheets-Sheet 6

INVENTOR.
CHARLES J. GREGOROVICH
BY
Jeffers and Young
ATTORNEYS

Feb. 13, 1968  C. J. GREGOROVICH  3,368,479
ROLLING BOLSTER MECHANISM FOR A PRESS
Filed Feb. 16, 1966  10 Sheets-Sheet 10

INVENTOR.
CHARLES J. GREGOROVICH
BY Jeffers and Young
ATTORNEYS

United States Patent Office 3,368,479
Patented Feb. 13, 1968

3,368,479
ROLLING BOLSTER MECHANISM FOR A PRESS
Charles J. Gregorovich, St. Marys, Ohio, assignor to The Minster Machine Company, Minster, Ohio, a corporation of Ohio
Filed Feb. 16, 1966, Ser. No. 538,121
21 Claims. (Cl. 100—229)

ABSTRACT OF THE DISCLOSURE

A self-contained rolling or sliding bolster for operation with a press which has a motor embodied therein for effecting movement of the bolster into and out of the press, and includes a single motor for raising and lowering the wheels to set the bolster down on the press bed; clamping the bolster to the press bed; and locating and locking the bolster in position on the press bed.

---

This invention relates to presses and the like, and is particularly concerned with a rolling or sliding bolster structure for use in connection with presses for effecting die changes therein.

Sliding or rolling bolsters for presses are known and consist of bolster members on which dies can be mounted and which bolster members can readily be moved into and out of the working space of the press thereby greatly facilitating the installing of dies in the press and removing of dies therefrom. When the die is extremely heavy then the advantage exists that the die can be moved by cranes and the like to and from the bolster and then readily moved into and out of the press by operation of the bolster. Even in cases where the dies are relatively light, it amounts to a considerable convenience to be able to place the die on the bolster outside the press and bolt the lower part of the die to the bolster whereupon the bolster can be moved into the press and the upper part of the die set secured to the press slide or platen.

Heretofore, most sliding bolster arrangements of the nature referred to have been constructed so as to be an integral part of the press structure. For this reason the press structure was of a specialized nature throughout. Furthermore, heretofore, most bolster arrangements of the nature referred to have relied on external power for the movement of the bolster into and out of the press as, for example, by means of an electric motor or motors mounted in the press bed and having driving connection with a rack or the like carried by the bolster so that the bolster could be powered into and out of the press bed. Such an arrangement, of course, represented specialization of the press structure and considerable expense at the time of manufacture of the press structure.

Having the foregoing in mind, it is a primary objective of the present invention to provide an improved sliding or rolling bolster arrangement for a press in which the press itself remains substantially conventional as to construction.

Another object of the present invention is the provision of a sliding or rolling bolster for a press in which the bolster is entirely self-contained, having embodied therein, the motors and the like for effecting movement of the bolster into and out of the press, and including the necessary motors for moving wheels for supporting the bolster carried by the bolster into effective position and for retracting the said wheels to set the bolster down on the press bed.

Still another object of the present invention is the provision of a self-contained bolster in which the bolster actuating motor means are embodied directly therein and wherein the control devices of actuating the motor means are also carried by the bolster itself so that to incorporate the bolster into the press structure there need be only a connection to the bolster for supplying power thereto.

Still a further object of the present invention is the provision of novel means for locating the bolster accurately in the press when it is moved therein without the use of extremely expensive key arrangements which have formerly been employed.

A still further object of this invention is the provision of a clamping means for clamping the bolster to the press bed when the bolster is in working position on the press bed and which clamping means is operable automatically upon lowering the bolster downwardly into engagement with the bed.

A still further object of this invention is the provision of an entirely self-contained bolster, which includes its own power devices, for use with a press in which the bolster is normally captive within the press frame so that it can be moved into and out of the press bed readily without particular attention to the limits of travel thereof but wherein the bolster can readily be withdrawn completely from the press bed if so desired.

The objects referred to above, as well as still other objects and advantages of the present invention will become more apparent upon reference to the following detailed description taken in connection with the accompanying drawings in which:

Figure 1:
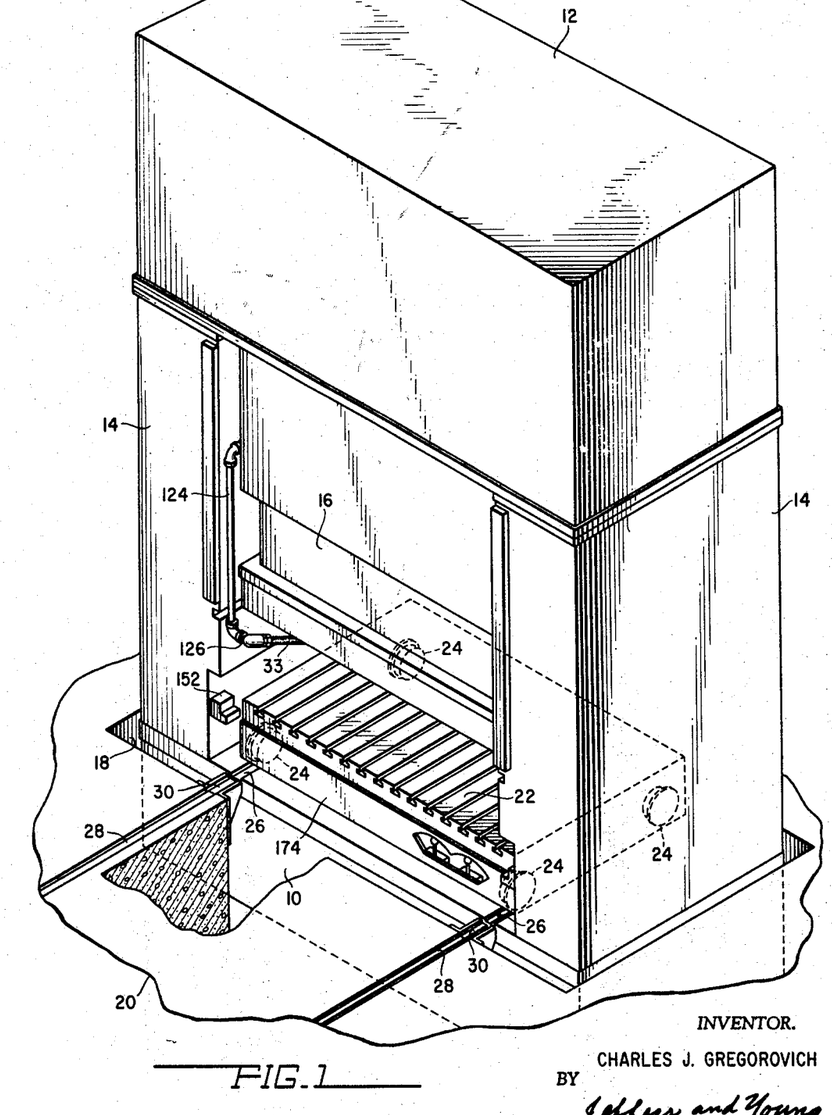
FIGURE 1 is a somewhat schematic perspective view of a press having a sliding or rolling bolster according to the present invention associated therewith.

Referring to the drawings in somewhat more detail and with particular reference to FIGURE 1, the press shown therein comprises a bed 10, a head 12, and vertical uprights 14 extending between the head and bed. Strain rods, not shown in FIGURE 1, extend between the head and bed and secure the entire assembly rigidly together. Power means, also not shown, are embodied in the head and are operable for reciprocating platen or slide 16 toward and away from bed 10 for carrying out work operations on work pieces placed in die sets mounted in the press.

The press illustrated is of substantial size and is generally mounted within a pit 18 formed in floor 20 to provide for a better working height of the working region of the press.

According to the present invention, a bolster 22 is provided on the press bed and which bolster has supporting wheel means 24 by means of which it is rollingly supported for movement into and out of the working space of the press. Bed 10 has tracks 26 formed therein which receive and guide wheel means 24 and floor 20 adjacent to press is likewise provided with tracks 28 which are in alignment with the tracks 26 of the bed. Either the bed or the floor surrounding the press may carry additionally the small transition members 30 which are short lengths of track that fill the space between the ends of the tracks 26 and 28 to provide for continuity of guiding of the bolster in its movement into and out of the working region within the press.

Figure 9:
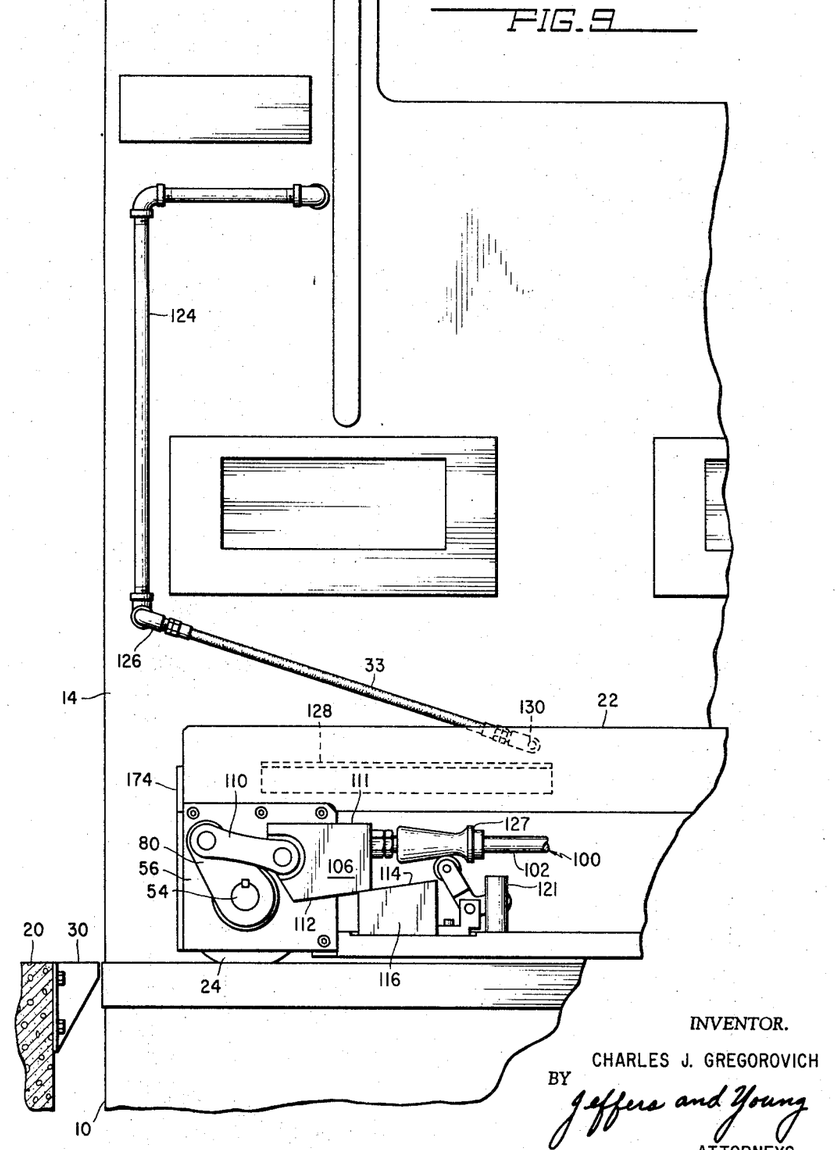
FIGURE 9 is a fragmentary view looking at the side of the bolster in position within the press showing the connection thereto of the pneumatic line for supplying pneumatic power to the bolster.

As has been mentioned, bolster 22 is entirely self-contained and embodies therein a first motor means for driving at least some of wheel means 24 in rotation to power the bolster into and out of the press and second motor means for raising and lowering the wheel means 24 on the bolster to raise and lower the bolster relative to the press bed. Such power means can be fluid operable or can be electric and in the present application the motors are illustrated as being fluid operable, as by compressed air, and to this end there is a single flexible hose connection 33 (FIGURE 9) made to the bolster and thus supplying energy thereto. Compressed air is readily aavilable in most places where presses of this nature are employed and therefore the use of fluid operable motor means such as pnuematic motors is quite advantageous. Furthermore, the flexible hose connection 33 does not interfere in any way with movement of the bolster into and out of working position in the press.

Bolster 22 is in the form of a fairly heavy casting or a weldment so that it has adequate strength for supporting die sets mounted thereon during working operations of the press. As will be seen in FIGURE 2, the bolster 22 is a substantially rectangular member having the aforementioned wheel means 24 located near the corners thereof so that the region inwardly of the wheels can be supplied with ribbing and the like for supporting the bolster on the press bed during working operations.

Figure 2:
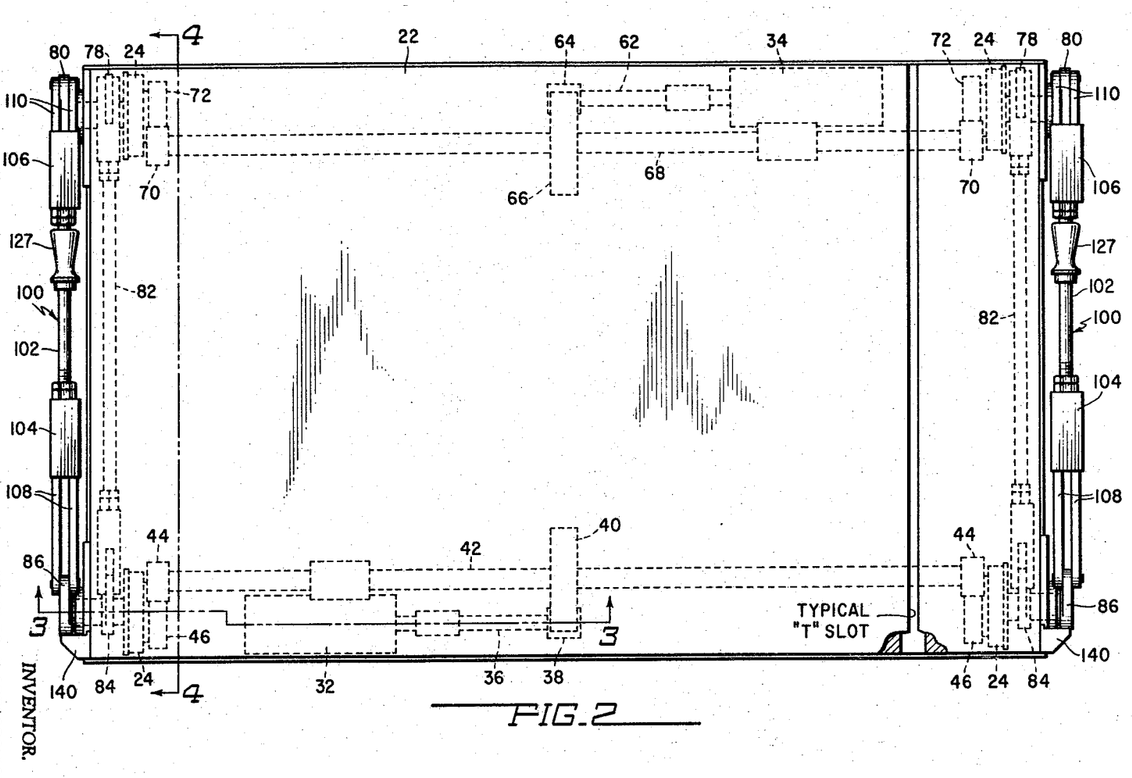
FIGURE 2 is a plan view looking down on top of the bolster.

FIGURE 2 also shows that contained within the bolster is a first motor means 32 by means of which at least the one laterally spaced pair of wheel means 24 of the bolster are rotated for moving the bolster into and out of the press. The second motor means at 34 is provided to operate the raising and lowering mechanism for the said wheels. Motors 32 and 34 are pneumatic and are supplied with compressed air by way of the flexible hose connection 33 as will be described more fully hereinafter.

Figure 3:
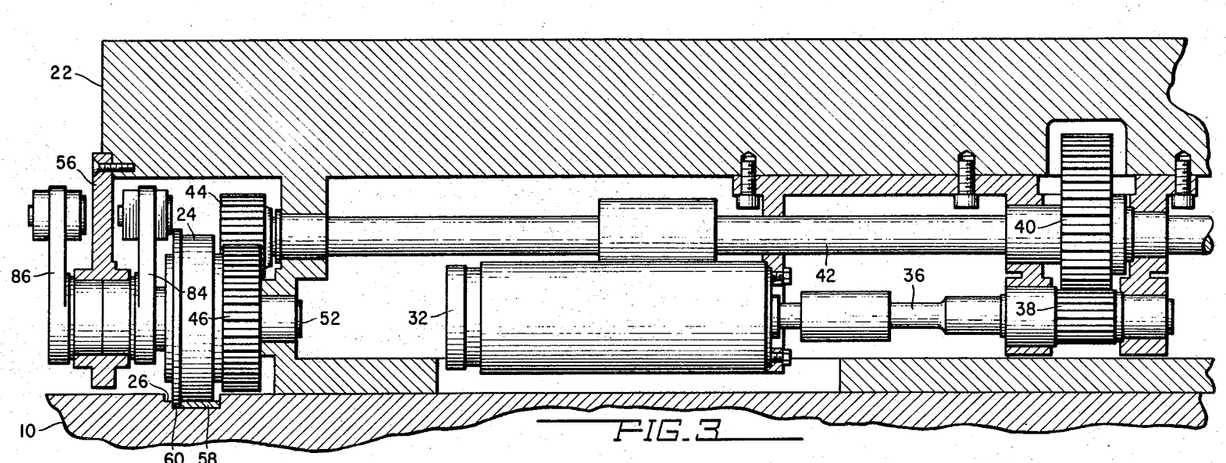
FIGURE 3 is a transverse sectional view indicated by section lines 3—3 on FIGURE 2.

As will be seen in FIGURE 3, pneumatic motor means 32 has an output shaft 36 which drives a pinion 38 located in about the center of the bolster and which pinion meshes with a gear 40 keyed or otherwise fixed to a shaft 42 extending laterally of the bolster from side to side. Shaft 42 at its ends carries pinions 44 which mesh with gears 46 which are fixed to and which may even be formed directly on one pair of the wheel means 24. The exact nature of this construction will be more clearly seen in FIGURE 7 where it will be seen that the gear 46 is actually integral with one of the wheel means 24. The wheel means 24, which is typical of all the wheel means as to its mounting, is carried by a pair of ball bearings 48 which are mounted on the eccentric portion 50 of a shaft 52 which is journalled in the bolster and which has an end portion 54 extending outwardly beyond a side plate 56 carried at the side of the bolster. This construction will also be seen in FIGURE 3 at the left side which corresponds to FIGURE 7 except being somewhat smaller in scale and with portions in elevation. Motor 32 is a reversible motor and it will be evident that by driving the motor 32 in one direction, the wheel means 24 to which it is connected will be caused to rotate in one direction and impel the bolster in one direction, whereas reversing of motor 32 will bring about impelling of the bolster in the other direction.

Figure 7:
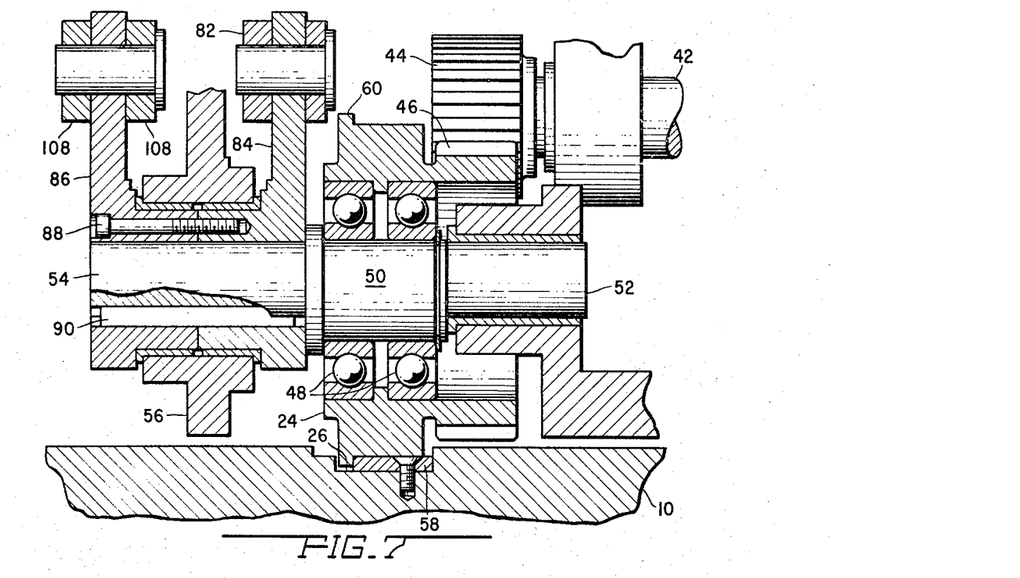
FIGURE 7 is a fragmentary vertical sectional view indicated by line 7—7 on FIGURE 5.

FIGURES 3 and 7 will also show that the previously referred to tracks 26 in the press bed are in the form of milled grooves or the like extending across the press bed and that within each of these milled grooves is a replaceable wear plate 58 on which the wheel means rest and by means of which the wheel means are guided because of the radial flanges 60 on the wheel means. The wear plates or rails may, of course, be hardened and are easily replaceable when worn.

As to the raising and lowering of the wheel means relative to the bolster in FIGURE 2 it will be seen that motor means 34 likewise has an output shaft, indicated at 62, and that this shaft drives a pinion 64 that meshes with the gear 66 located in about the middle of one side of the bolster. Gear 66 is affixed to a shaft 68 extending laterally of the bolster from side to side and having on each end thereof a pinion 70. As will be seen in FIGURES 4 and 8, each pinion 70 meshes with a gear 72.

Figure 8:
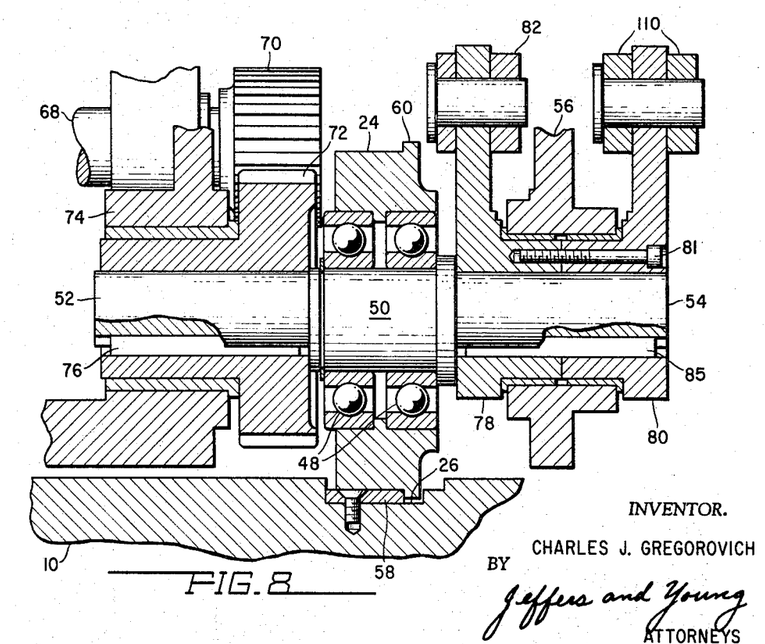
FIGURE 8 is a sectional view similar to FIGURE 7 and is indicated by section line 8—8 on FIGURE 5.

As will best be seen in FIGURE 8, each gear 72 is journalled in an adjacent portion 74 of the bolster frame and is keyed by a key 76 to the adjacent end of the shaft portions 52 for the adjacent wheel means 24. As will be seen in FIGURE 8, on the other end of the shaft, indicated 54, there is a pair of crank arms. One of the said crank arms at 78 is located inside the end closure wall 56 of the bolster whereas the second crank arm 80 is located outside the said end wall. The two crank arms are secured together by screw means 81 and are keyed to shaft portion 54 by a key 83 so that as gear 72 is rotated, the crank arms 78 and 80 will turn with the gear.

Figure 4:
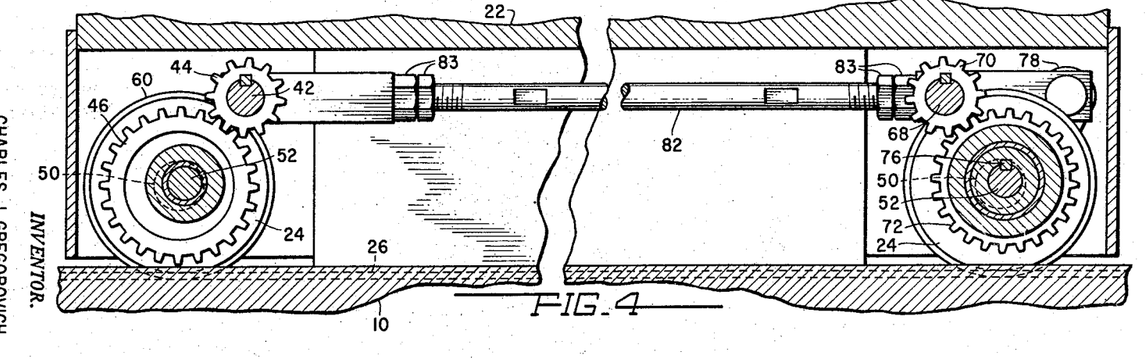
FIGURE 4 is a longitudinal sectional view indicated by line 4—4 on FIGURE 2 and shows the bolster set down on the press bed.

The crank arm 78 inside the side wall 56 of the bolster is connected by a link 82, best seen in FIGURE 2 and also in FIGURE 4, with a similar crank arm 84 fixed to portion 54 of the shaft pertaining to the wheel means 24 on the same side of the bolster. Each of the last mentioned shaft means 54 (FIGURES 7 and 8) also has, on the outside of the side wall 56 of the bolster, a second crank arm 86 (FIGURE 7) and 80 (FIGURE 8) which is connected by the aforementioned link means 100 (FIGURE 2) with the pertaining crank arm at the end of the bolster illustrated in FIGURE 8. Crank arms (FIGURE 7) 84 and 86 are interconnected by screw means 88 and are keyed to their pertaining shaft portion 54 by a key 90.

From the foregoing it will be appreciated that energization of motor 32 will cause movement of the bolster by driving one pair of its supporting wheel means 24, whereas, energization of motor 34 will bring about movement of the eccentric shafts supporting the wheel means so that the wheel means are either raised or lowered relative to the bolster structure thereby either lifting the bolster structure from the press bed or setting the bolster structure down on the press bed.

The moving bolster arrangement of the present invention includes a novel arrangement for clamping the bolster to the press bed when the bolster is positioned thereon in working position. Conveniently, the clamping arrangement according to the present invention is operated into clamping position simultaneously with setting the bolster down on the press bed and is operated into unclamping position simultaneously with lifting the bolster from the press bed whereby the maximum in the conservation of time and mechanism is observed.

Figure 12:
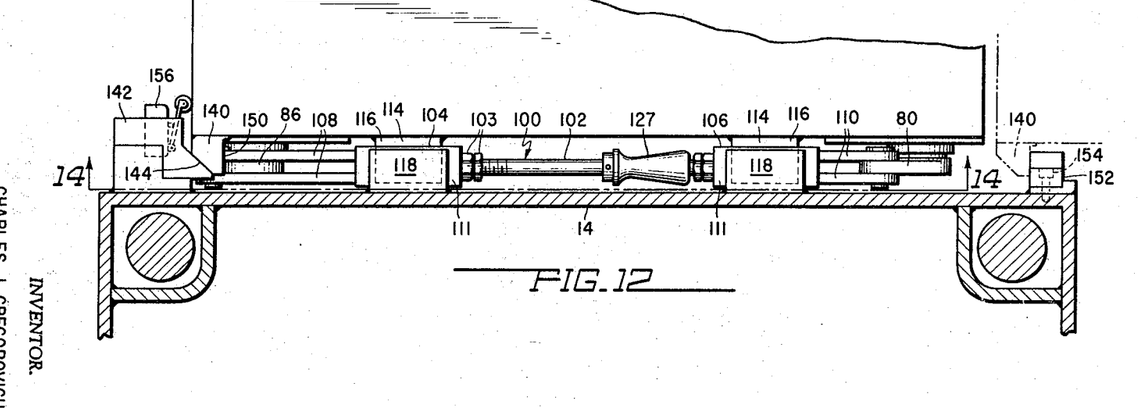
FIGURE 12 is a somewhat schematic plan view showing the stop means for halting the bolster during its movement into and out the press bed so that the bolster is normally captive in press bed.
Figure 14:
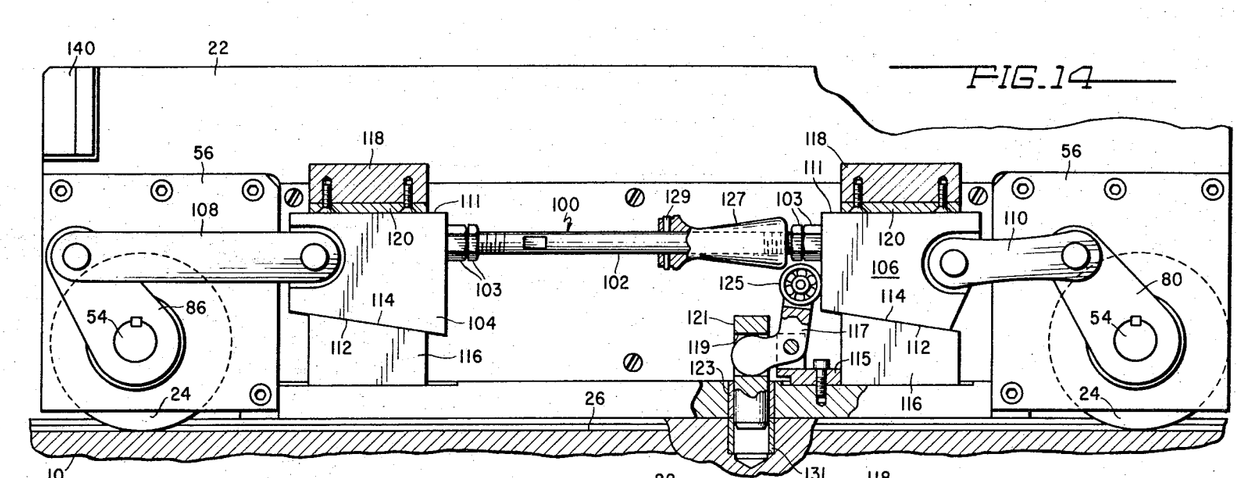
FIGURE 14 is a view looking in at the side of the bolster with the bolster lowered to the bed in working position thereon and wedged in its working position on the press bed.
Figure 15:
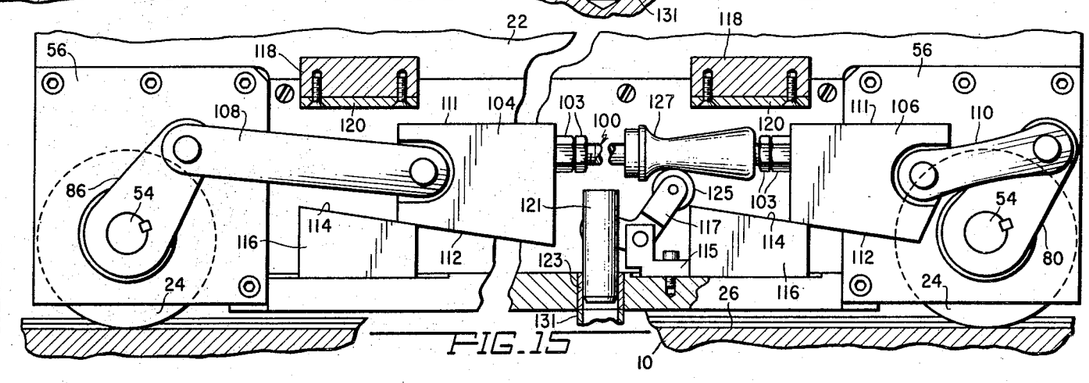
FIGURE 15 is a view like FIGURE 14 but shows the bolster with the support wheels therefor moved downwardly on the bolster thereby to lift the bolster from the press bed while simultaneously the clamping wedges for the bolster are released so that the bolster can be moved out of the press bed.

As will be seen in FIGURE 2, the outermost crank arms 80 and 86, at the opposite ends of the bolster, are interconnected by linkages generally indicated at 100 and which are shown in detail in FIGURES 12, 14 and 15. Each of these linkages comprises a center rod portion 102 having its end portions threaded into wedge blocks 104 and 106 and which wedge blocks, in turn, are connected by respective links 108 and 110 with the aforementioned outer crank arms 80 and 86.

The opposite ends of rod 102 are threaded in respectively opposite directions to engage corresponding threads in blocks 104 and 106 whereby the rod can be adjusted to eliminate all lost motion in the clamping linkage and to adjust the blocks relative to each other accurately to cause both blocks at both ends of the bolster to take the proper part in the clamping operation. Lock nuts 103 lock rod 102 in its adjusted positions.

Figure 5:
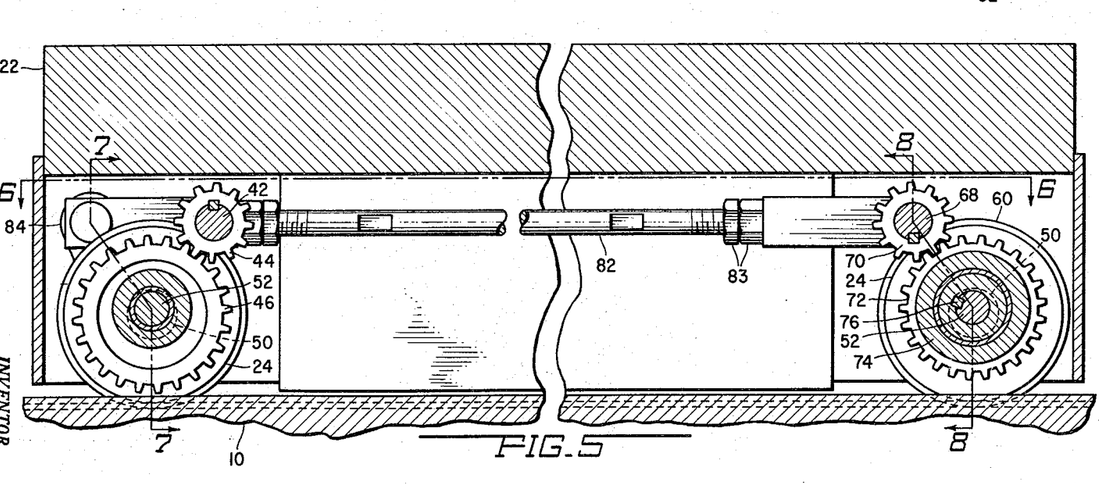
FIGURE 5 is a view like FIGURE 4 which shows the eccentric wheel adjusting mechanism moved into position to elevate the bolster above the press bed.
Figure 6:
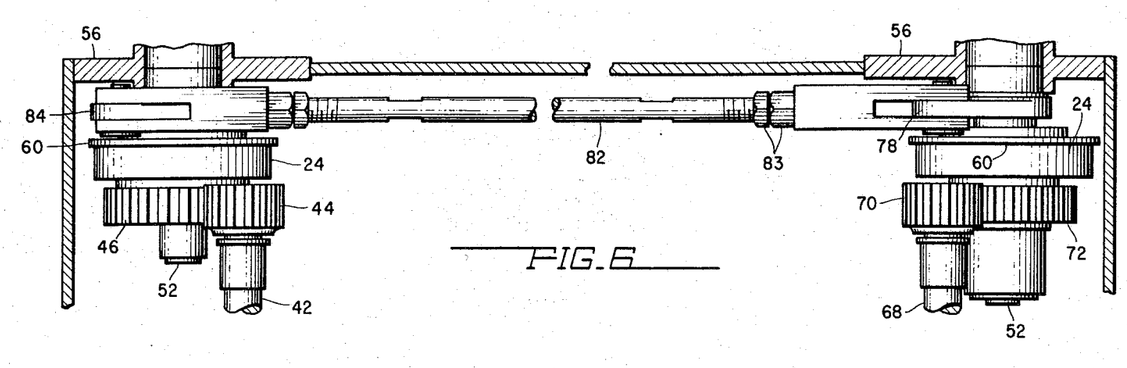
FIGURE 6 is a fragmentary plan sectional view indicated by section line 6—6 on FIGURE 5.

The opposite ends of rods 82 (FIGURES 5 and 6) are also threaded in respectively opposite directions and the entire clamping and wheel elevating and lowering linkage can thus be adjusted to produce exactly the desired result. Lock nuts 83 lock rod 82 in its adjusted positions.

Each of the said blocks 104 and 106 has an upper horizontal surface 111 and a lower inclined surface 112. The lower inclined surfaces co-operate with the upper inclined surfaces 114 of members 116 which project laterally from the ends of the bolster structure and are either integral therewith or are fixedly secured thereto.

The upper flat horizontal surfaces of blocks 104 and 106, on the other hand, co-operate with the lower flat surfaces of projections 118 which are located on the inside walls of uprights 14 of the press frame. These members are integral with or are bolted on the uprights of the press and are thus rigidly fixed with respect to the press bed. It will be evident that driving the wedge blocks 104 and 106 in one direction will force the bolster firmly down against the press bed whereas movement of the wedge blocks in the other direction will release the clamping arrangement and permit the bolster to be lifted from the press bed and moved by actuation of the wheel means therefor. Advantageously, members 118 have wear plate members 120 secured to their underneath sides and which members are replaceable should this become necessary.

In FIGURE 14 the bolster will be seen to be lowered to the press bed and resting thereon and firmly clamped thereto whereas in FIGURE 15 the bolster is lifted upwardly from bed 10 and can be moved out of the press bed by actuation of the wheel means.

It will be understood, of course, that when the bolster is lowered to the press bed, some over travel of the linkage for actuating the wheel means in their up and down direction will take place in order to elevate the wheel means somewhat from the bed and thereby insure that the bolster is firmly seated on the bed. This over travel of the linkage is availed of for effecting the final clamping of the bolster to the bed, and, similarly, when the operation is reversed, the over travel permits loosening of the clamping arrangement before the wheel means engage the tracks in the bed and commence to elevate the bolster therefrom.

As to locating and locking the bolster in working position on the bed, it is advisable to employ, in addition to the tapering back stops, locking pins which key the bolster directly to the bed.

Such an arrangement will be seen in FIGURES 14 and 15. The bolster carries a bracket 115 in which a two armed lever 117 is pivoted. One arm of lever 117 fits in slot 119 of lock pin 121 which is guided in bushing 123 in the bolster. The other arm of lever 117 carries a ball bearing roller 125 which is engageable on one side by wedge member 106 and on the other side by a cam block 127 connected to rod 102 by tapered pin 129.

When block 106 moves leftwardly to its FIGURE 14 position to clamp the bolster to the bed, pin 121 is pushed downwardly into bushing 131 in the bed to lock the bolster against any movement parallel to the bed. The tapered end on pin 121 will locate the bolster if it is near to but not exactly in working position.

When block 106 moves rightwardly to its FIGURE 15 position to unclamp the bolster, cam block 127 engages roller 125 and tilts lever 117 to withdraw pin 121 from bushing 131 so the bolster can roll freely on its wheels.

Normally one locking pin on each side of the bolster is ample but more could be provided if necessary. It will be evident that a single motor is operable for (a) setting the bolster down on the bed; (b) clamping the bolster to the bed; and (c) locating and locking the bolster in position on the bed.

Figures 10, 11:
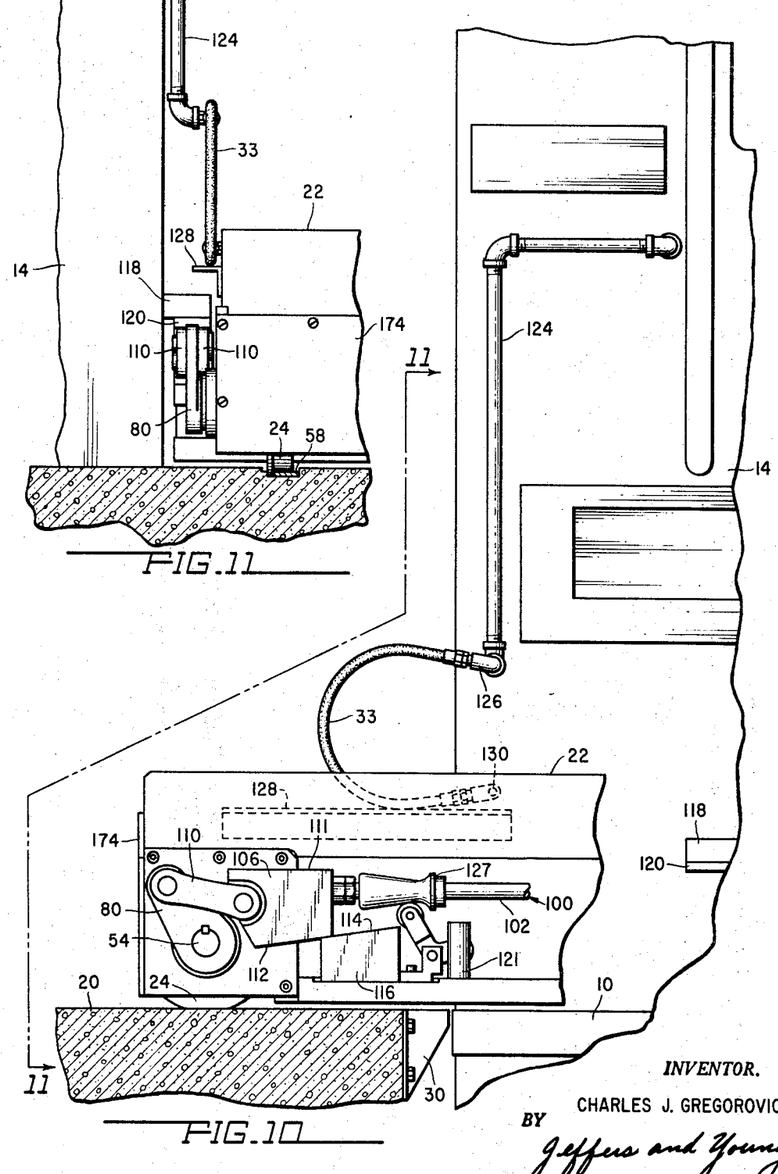
FIGURE 10 is a view similar to FIGURE 9 but shows the bolster during its travel to or from working position on the press bed.
FIGURE 11 is a fragmentary sectional view indicated by section line 11—11 of FIGURE 10 and showing the wedge means that serves to clamp the bolster down on the bed in working position thereon.

As will best be seen in FIGURES 10 and 11, the aforementioned flexible hose connection 33 is positioned at one side of the bolster out of the working space of the press. The hose connection 33 is connected with a rigid supply conduit 124 by means of a swivel joint 126 and the hose is long enough to permit the bolster to move completely out of the press into position for removing die means therefrom, for placing die means thereon and can then be moved completely into the press into working position therein. During the travel of the bolster into and out of the press the hose 33 will, of course, flex and in order to prevent abrasion of the hose during bolster movement, an angular support plate 128 is secured to the side of the bolster and on which the hose rests as the bolster moves in and out. The bolster end of the flexible hose 33 is likewise connected with the bolster by means of a swivel joint 130 and, by the provision of the two swivel joints, the hose 33 can be kept at a minimum length and thereby eliminate difficulties that might arise on account of excessive length of the hose. By making the hose relatively stiff, it will always be disposed in a vertical plane and will not kink sharply at any time. This element of the combination thus has long life and is substantially trouble free.

Figure 13:
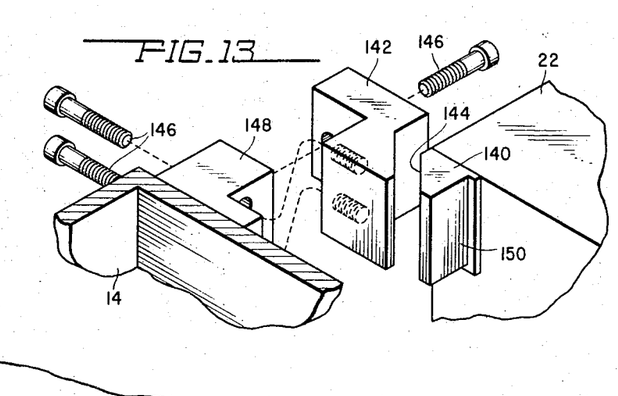
FIGURE 13 is a schematic perspective view showing one of the stops carried by the press bed and showing how the stop is detachably mounted for removal from the press bed.

It has been mentioned that the bolster is normally captive in the press and this is brought about by stop means that limits the inward and outward movement of the bolster with respect to the press. The stop means referred to are best illustrated in FIGURES 12 and 13. In FIGURE 12, the bolster 22 is shown in working position in the press frame. On the corners of the bolster toward the left side of FIGURE 12, there are stop members 140 which project laterally from the bolster for cooperation with stop members 142 fixed on the press uprights adjacent thereto. The stop members 140 have inclined surfaces 144 thereon co-operating with corresponding inclined surfaces on the stop members so that when the bolster is driven toward stop members 142 and the stop members 140 on the bolster engage the press frame mounted stop members 142, the bolster will be caused to stop in the press frame in a predetermined lateral location therein. The beveled faces on the stop members thus serve as locating means for the bolster as well as stop means therefor.

As will be seen in FIGURE 13, the stop members 142 are preferably bolted by bolts 146 to block element 148 which may be welded inside the uprights 14 of the press.

Stop members 140 can also advantageously be welded on the bolster, or may be bolted thereto if desired.

The stop members 140 on the bolster have straight faces 150 on the sides thereof facing away from stop members 142 and these faces are adapted for co-operating with stop members 152 (FIGURE 12) fixed to the inside of the press uprights 14 for stopping the bolster in its outward movements. Stop members 152 are secured to the uprights by bolts 154 so that they can be removed from the press frame and thereby permit the bolster to be rolled completely out of the press if so desired. It will therefore be seen that while the bolster is normally captive within the press and can only move between predetermined limits in its travel into and out of the press, it is a relatively simple matter to remove the stop means 152 and remove the bolster completely from the press if so desired.

In connection with the stop members 142 at the back of the press, one or the other thereof can be availed of for mounting a limit switch 156 for engagement by the bolster when the bolster is completely in and is located in working position in the press whereby the arrangement illustrated can be automated and the setting down and the clamping of the bolster take place automatically. Alternatively, the limit switch can be availed of for actuating a signal light to indicate when the bolster is completely in the press.

Figure 16:
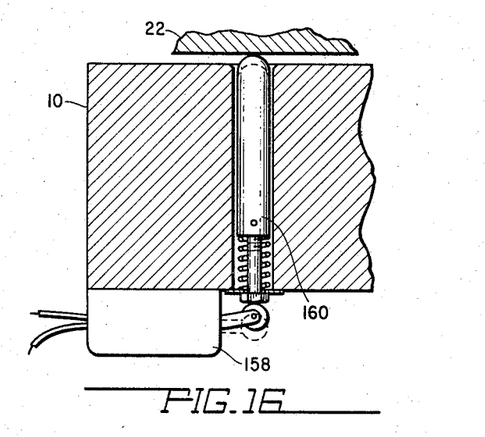
FIGURE 16 is a fragmentary sectional view showing the arrangement of a detector for detecting when the bolster is set down on the press bed.

There may similarly be provided, as illustrated in FIGURE 16, another limit switch 158 carried at some suitable location in the press bed and with which is associated an actuating plunger 160 which is pressed downwardly when the bolster is lowered on the bed, as illustrated in FIGURE 14, to actuate switch 158 thereby to indicate that the bolster is down in working position on the press bed whereas, when the bolster is elevated, as illustrated in FIGURE 15, plunger 160 will release limit switch 158 from its actuated position. This limit switch can also be employed for automation purposes or for actuating signal lights or the like.

Figure 17:
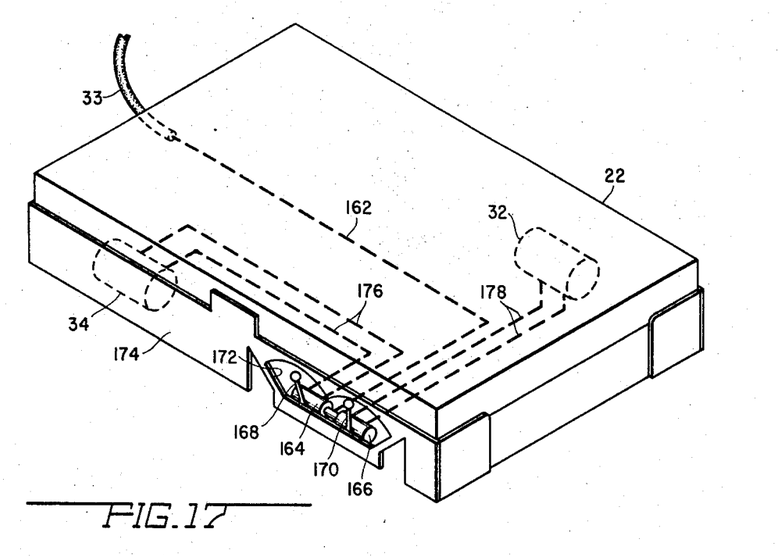
FIGURE 17 is a schematic perspective view showing the pneumatic system for the bolster motors.

FIGURE 17 illustrates somewhat schematically the manner in which the bolster is controlled. In FIGURE 17 it will be seen that flexible hose 33 is connected to conduit means 162 inside the bolster with the inlet sides of control valves 164 and 166 located at the front of the bolster and having operating handles 168 and 170 which are accessible through an opening 172 provided in front cover plate 174 of the bolster. One of the valves 164 and 166 is connected by conduits 176 with motor 34 whereas the other of the said valves is connected by conduits 178 with the other of the said motors 32. The valves 164 and 166 are, of course, located at the front side of the bolster which is the direction in which the bolster moves when coming out of the press.

In fact it has been found that vertical movement of the bolster in an amount of about ⅛ inch, slightly more or less, is ample to provide clearance of the bolster from the bed for moving the bolster into and out of the bed. To accomplish this amount of movement and to provide some over travel of the wheels, the eccentric shafts turn such an amount that the total wheel travel in the vertical direction relative to the bolster is on the order of about 3/16th of an inch and whereby, with the bolster traveling ⅛ inch between its uppermost and lowermost positions, the bolster wheels will be lifted from the tracks somewhat on the order of 1/16 inch when the lowering operation has been completed. It will be appreciated, particularly from FIGURE 4, that the direction of movements of the wheel means is such that there is a minimum change in the meshing condition of pinion 44 with their pertaining gears 46. The gears 72, of course, do not partake of the vertical movement of the wheels, therefore there is no change in the meshing conditions of the pinions 70 and the gears 72. The slight change in conditions of meshing between pinions 44 and their pertaining gears 46 is not such as to interfere in any way with their proper operation.

Although the present invention has been illustrated and described in connection with a particular embodiment, it will be understood that this is illustrative of the invention and is by no means restrictive thereof. It is reasonable to expect that those skilled in this art can make numerous revisions and adaptations of the invention and it is intended that such revisions and adaptations will be included within the scope of the following claims as equivalents of the invention.

We claim:

1. A rolling bolster for a press, said bolster comprising: a substantially rigid blocklike body having a top surface for receiving working tools and also having a bottom surface, wheels on the body near the corners thereof, support means supporting the wheels on the body for rotation thereon and for movement vertically thereon, first motor means in the body operatively connected with at least one of said wheels for driving the said wheel in rotation to cause the bolster to move while supported on the wheels, second motor means in the body operatively connected with said support means for causing vertical movement on the body of the wheels simultaneously to cause the wheels to project below the bottom surface of the bolster and rollingly support the bolster or to retract above the bottom surface of the bolster so the bolster will be set down on its bottom surface, and horizontally movable clamping means operable by the second motor simultaneously with the vertical movement of the bolster to clamp or unclamp the bolsters to the press bed.

2. A rolling bolster according to claim 1 in which said support means comprise eccentrics rotatable in the body and rotatably supporting the said wheels on the body, linkage means interconnecting said eccentrics for the simultaneous actuation thereof to raise and lower said wheels in unison on said body, said first and second motor means comprising first and second fluid operable motors in said body, drive means connecting said first motor with a laterally spaced pair of said wheels for driving said pair of wheels in rotation, means connecting said second motor with said linkage for actuating said eccentrics in rotation to raise and lower said wheels on said body, conduit means leading to said body for the supply of fluid to said motors, and control valve means in said body connecting said conduit means with said first and second fluid operable motors.

3. A rolling bolster according to claim 2 in which said drive means comprises gear means on said laterally spaced pair of said wheels, a shaft extending laterally in the body and having pinions on the ends thereof meshing with said gear means, means drivingly connecting said first motor with said shaft for driving the shaft and, therefore, said pair of wheels in rotation, said first and second motors being pneumatically operable, a single compressed air supply conduit leading to said body, and said control valves carried by said body connecting said conduit with said motors.

4. A rolling bolster according to claim 3 in which said linkage means includes a crank arm fixed to each said eccentric, arms at each lateral side of the bolster interconnecting the said crank arms at that side of the bolster, a gear on each of a pair of laterally spaced eccentrics, a second shaft extending laterally in the bolster body and having pinions meshing with said gears, and means connecting said second motor with said second shaft, whereby all said eccentrics are actuated in unison by said second motor.

5. A rolling bolster according to claim 4 in which each said arm at each side of the bolster is adjustable as to the effective length thereof.

6. A rolling bolster according to claim 5 in which each of said eccentrics also has a second crank arm fixed thereto and located outside the side walls of the bolster, linkage connecting the second crank arms at the respective sides of the bolster, and said clamping means carried by said last mentioned linkage.

7. A rolling bolster according to claim 6 in which said clamping means comprises wedge blocks carried by the pertaining linkage and movable in the fore and aft direction of the bolster upon rotation of said wheel supporting eccentrics, and wedge shaped portions carried by and extending laterally from the sides of said bolster body and co-operating with said wedge blocks.

8. A rolling bolster according to claim 7 which includes vertically reciprocable lock pin means on the bolster and means for moving said pin means vertically on said bolster simultaneously with the actuation of said clamping means.

9. A rolling bolster according to claim 7 in which said wedge blocks include a pair of wedge blocks on each side of the bolster and a rod on each side of the bolster interconnecting the pertaining wedge blocks, vertically reciprocable lock pin means on the bolster, two armed lever means pivotally mounted on the bolster having one arm connected with the pin means, the other arm of said lever means being disposed in the path of one of said wedge blocks for actuation thereby in a direction to move said pin means downwardly when the wedge block moves in clamping direction, and a cam block on said rod to engage said other arm and move it in a direction to move said pin means upwardly when the rod moves in unclamping direction.

10. A rolling bolster according to claim 7 in which said linkage pertaining to said clamping means comprises link elements pivotally connected to said second crank arms and also pivotally connected to said wedge blocks, and a rod extending between the wedge blocks at each end of the bolster and connected to the respective wedge blocks by threads of respectively opposite hand whereby the rod can be availed of for adjusting the spacing between the said wedge blocks.

11. In combination: a press having a bed and a head and uprights extending vertically therebetween, and a self-contained bolster rollingly supported on the bed for movement into and out of working position on the press bed, said bolster having a substantially rigid blocklike body, wheels near the corners of said body, support means supporting the wheels on the body for rotation thereon and for vertical movement thereon, a first motor in the body operatively connected with at least one of said wheels for driving the one wheel in rotation, a second motor in the body operatively connected with said support means for actuating the support means to raise and lower said wheels in unison, horizontally movable clamping means and vertically movable locating means operable by the said second motor simultaneously with the raising and lowering of the support means to clamp and located the bolster or the press bed, flexible means leading from the press to the bolster body to supply energy to said motors, and tracks on the bed engaged by said wheels to guide the bolster into and out of the press.

12. The combination according to claim 11 in which said motors comprise pneumatically operable motors, said flexible means comprising a flexible conduit, said conduit leading from one end of the bolster to the adjacent press upright, and swivel joints connecting the ends of the conduit with said upright and with said bolster.

13. The combination according to claim 12 in which said bolster includes stop members carried by the sides of the bolster and projecting inwardly from the uprights of said press for co-operation with the stop member on the bolster to limit the inward and outward movement of the bolster with respect to the press bed.

14. The combination according to claim 13 in which the said stop elements on the bolster are mounted on the rearmost corners of said bolster and the said stop members on the insides of the said press uprights are mounted on the front and back portion of the uprights.

15. The combination according to claim 14 in which the stop elements on said bolster have surfaces which converge toward the rear of the bolster and the stop members at the rear of said uprights also have surfaces which converge toward the rear of the press and are engageable with said surfaces on said stop elements whereby the bolster is moved into the press, the said stop elements and the rear stop members on the uprights co-operate to locate the bolster laterally of the press.

16. The combination according to claim 15 in which at least one of the stop elements on said bolster and one set of said stop members on the press uprights are detachably mounted so as to permit complete removal of the bolster from the press if so desired.

17. The combination according to claim 11 in which said clamping means includes wedge block means carried by the bolster at each end thereof immediately inside the adjacent upright, wedge members fixed to the sides of the bolster and extending laterally therefrom beneath said wedge block means, and abutment means on the press uprights which are positioned above said wedge members when the bolster is in working position and between wedge and said wedge members said wedge block means are disposed, and means for moving said wedge block means to clamp the bolster to the bed.

18. The combination according to claim 11 in which said clamping means comprises horizontally extending downwardly facing abutments on the insides of said uprights extending inwardly therefrom toward said bolster, wedge members fixed to the sides of the bolster extending laterally outwardly therefrom and positioned under said abutments when the bolster is in working position on the press bed, said wedge members having upper surfaces inclined in the direction of movement of the bolster, and wedge blocks carried by the bolster having upper horizontal surfaces and lower surfaces inclined in the same direction as hte upper surfaces of said wedge members and said abutments when the press is in working position, and means for moving said wedge blocks in the direction of movement of said bolster thereby to effect clamping of the bolster to the bed when the bolster is in working position and is lowered to the press bed.

19. The combination according to claim 18 in which said bolster body includes eccentrics supporting said wheels, means interconnecting said eccentrics for the simultaneous actuation thereof to retract said wheels upwardly on the bolster body to set the bolster down on the press bed, and means connecting said eccentrics with said wedge blocks for simultaneous actuation of the eccentrics and the wedge blocks.

20. The combination according to claim 19 in which the means for raising and lowering said bolster comprises motor means mounted in said body and connected to said eccentrics, and control means for said motor means also mounted in said body.

21. The combination of a press having a press frame including a bed and uprights extending upwardly from the sides of the bed and a rolling bolster on the bed for movement into and out of the press frame, wheels carried by the bolster, co-operating elements of stop means caried by the bolster and the uprights co-operating to limit the movements of the bolster in both in and out directions relative to the press frame, first motor means for causing at least one of said wheels to be driven in rotation to move the bolster on the press bed, second means operable to cause raising and lowering of the wheels in unison on the bolster to support the bolster on the wheels or to lower it to the press bed, third means carried by the bolster and co-operating with said uprights to clamp the bolster to the bed when lowered thereto, fourth means operable for locating and locking the bolster on the bed, and second motor means carried by the bolster for actuating said second, third and fourth means and control means for said first and second motor carried by the bolster whereby the bolster is entirely self-contained and requires only a supply of energy thereto to make it completely operative.

References Cited

UNITED STATES PATENTS

| | | | |
|---|---|---|---|
| 2,996,025 | 8/1961 | Georgeff | 72—446 |
| 3,002,479 | 10/1961 | Johansen | 72—412 |
| 3,111,100 | 11/1963 | Georgeff | 72—414 |
| 3,134,350 | 5/1964 | Danly et al. | 72—414 |
| 3,207,065 | 9/1965 | Danly | 100—229 |
| 3,183,828 | 5/1965 | Clements | 100—229 |
| 3,225,686 | 12/1965 | Clements | 100—43 |
| 3,230,869 | 1/1966 | Wilkins | 100—214 |
| 3,306,185 | 2/1967 | Soman | 100—229 |

FOREIGN PATENTS 567,875  12/1958  Canada.

BILLY J. WILHITE, *Primary Examiner.*